United States Patent
Omer et al.

(10) Patent No.: US 10,607,116 B1
(45) Date of Patent: Mar. 31, 2020

(54) AUTOMATICALLY TAGGING IMAGES TO CREATE LABELED DATASET FOR TRAINING SUPERVISED MACHINE LEARNING MODELS

(71) Applicant: Eyezon Ltd, Tel-Aviv (IL)

(72) Inventors: Avinoam Omer, Shilat (IL); Gil-ad Gal, Jerusalem (IL)

(73) Assignee: Eyezon Ltd, Tel-Aviv (IL)

(*) Notice: Subject to any disclaimer, the term of this patent is extended or adjusted under 35 U.S.C. 154(b) by 0 days.

(21) Appl. No.: 16/383,732

(22) Filed: Apr. 15, 2019

Related U.S. Application Data

(60) Provisional application No. 62/753,089, filed on Oct. 31, 2018, provisional application No. 62/752,800, filed on Oct. 30, 2018.

(51) Int. Cl.
*G06K 9/62* (2006.01)
*G06K 9/00* (2006.01)
*G06Q 10/06* (2012.01)
*G06Q 20/20* (2012.01)

(52) U.S. Cl.
CPC ....... *G06K 9/6259* (2013.01); *G06K 9/00771* (2013.01); *G06Q 10/06393* (2013.01); *G06Q 20/201* (2013.01); *G06Q 20/208* (2013.01)

(58) Field of Classification Search
CPC ............ G06K 9/6259; G06K 9/00771; G06Q 20/201; G06Q 20/208; G06Q 10/06393
See application file for complete search history.

(56) References Cited

U.S. PATENT DOCUMENTS

| | | | |
|---|---|---|---|
| 9,218,366 B1* | 12/2015 | Li | G06F 16/5838 |
| 9,830,526 B1* | 11/2017 | Lin | G06K 9/6298 |
| 9,892,344 B1* | 2/2018 | Tran | G06K 9/66 |
| 10,212,319 B1* | 2/2019 | Carter, II | G06K 9/00288 |
| 10,217,120 B1* | 2/2019 | Shin | G06Q 30/0201 |
| 10,322,881 B1* | 6/2019 | Manyam | G06N 5/048 |
| 10,387,896 B1* | 8/2019 | Hershey | G06K 9/00771 |
| 2014/0040173 A1* | 2/2014 | Sagher | G06N 20/00 706/12 |
| 2015/0055855 A1 | 5/2015 | Rodriguez et al. | |
| 2016/0110703 A1* | 4/2016 | Herring | G01G 19/4144 705/23 |
| 2018/0025412 A1* | 1/2018 | Chaubard | G06K 9/00771 705/26.9 |
| 2018/0232601 A1* | 8/2018 | Feng | G06T 7/0004 |
| 2019/0034822 A1* | 1/2019 | Farre Guiu | G06N 5/022 |

(Continued)

Primary Examiner — Ming Y Hon

(57) ABSTRACT

A method of automatically producing a labeled dataset for training a supervised Machine Learning (ML) model to identify items purchased in a store. The method comprising receiving images captured by imaging sensor(s) deployed to monitor an interior space of a store in which a plurality of items are offered for sale, detecting items picked up by customers tracked in the store based on analysis of the images, detecting the picked up items while checked out for the tracked customers at a POS comprising a POS reader configured to read an identifier of each checked out item, correlating between the detected picked up items and respective identifiers received from the POS reader according to timestamps of the identifiers read events, labeling each image depicting a detected item with the respective identifier and outputting a labeled dataset comprising a plurality of labeled images.

8 Claims, 5 Drawing Sheets

(56) References Cited

U.S. PATENT DOCUMENTS

2019/0065881 A1* 2/2019 Zucker .................... G06K 9/34
2019/0156122 A1* 5/2019 Lu ....................... G06K 9/00684
2019/0188876 A1* 6/2019 Song ........................ G06T 7/70

* cited by examiner

AUTOMATICALLY TAGGING IMAGES TO CREATE LABELED DATASET FOR TRAINING SUPERVISED MACHINE LEARNING MODELS

RELATED APPLICATIONS

This application claims the benefit of priority under 35 USC § 119(e) of U.S. Provisional Patent Application No. 62/753,089 filed on Oct. 31, 2018, the contents of which are incorporated herein by reference in their entirety. This application also claims the benefit of priority under 35 USC § 119(e) of U.S. Provisional Patent Application No. 62/752,800 filed on Oct. 30, 2018.

FIELD AND BACKGROUND OF THE INVENTION

The present invention, in some embodiments thereof, relates to creating a labeled dataset for training a Machine Learning (ML) model to identify items offered for sale in a store, and, more specifically, but not exclusively, to creating automatically a labeled dataset for training a supervised ML model to identify items offered for sale in a store based on item identification at the store's checkout Point Of Sale (POS).

Over the past few years, automated and/or autonomous services, platforms and systems have rapidly and dramatically advanced to encompass many applications in the modern era ranging from civil applications (e.g. autonomous cars, custom advertisement, etc.), through industrial, agricultural applications and/or military applications to research and academic work.

Automated stores is a newly introduced member of such automated services and at least partially automated stores have recently opened in the US leading the way to fully automated stores in the future. The automated store aims to allow customers to purchase products in the store without being checked out by a cashier or using a self-checkout station.

To this end the automated stores may employ advanced and complex technologies, including computer vision, machine learning models and algorithms, and sensor fusion to track customers, identify items for sale in the store, and detect interaction of the customers with the items and more in order to automate most of the purchase, checkout, and payment steps associated with a retail transaction.

SUMMARY OF THE INVENTION

According to a first aspect of the present invention there is provided a computer implemented method of automatically producing a labeled dataset for training a supervised Machine Learning (ML) model to identify items purchased in a store, comprising using one or more processors for:
  Receiving a plurality of images captured by one or more imaging sensors deployed to monitor an interior space of a store in which a plurality of items are offered for sale.
  Detecting, in one or more of the plurality of images, one or more of the plurality of items picked up by one or more customers tracked in the store based on analysis of the plurality of images.
  Detecting one or more picked up items while checked out for one or more of the tracked customers at a Point of Sale (POS) comprising a POS reader configured to read an identifier of each checked out item.
  Correlating between one or more of the detected item and respective identifiers received from the POS reader according to timestamps of the respective identifiers read event received from the POS reader.
  Labeling each of the plurality of images which depicts a detected item with the respective identifier.
  Outputting a labeled dataset comprising a plurality of labeled images. The labeled dataset is used to train one or more supervised ML models to estimate the identifiers of one or more of the items.

According to a second aspect of the present invention there is provided a system, for automatically producing a labeled dataset for training a supervised ML model to identify items purchased in a store, comprising one or more processors executing a code. The code comprising:
  Code instructions to receive a plurality of images captured by one or more imaging sensors deployed to monitor an interior space of a store in which a plurality of items are offered for sale.
  Code instructions to detect, in one or more of the plurality of images, one or more of the plurality of items picked up by one or more customers tracked in the store based on analysis of the plurality of images.
  Code instructions to detect one or more picked up items while checked out for one or more of the tracked customers at a POS comprising a POS reader configured to read an identifier of each checked out item.
  Code instructions to correlate between one or more of the detected item and respective identifiers received from the POS reader according to timestamps of the respective identifiers read event received from the POS reader.
  Code instructions to label each of the plurality of images which depicts a detected item with the respective identifier.
  Code instructions to output a labeled dataset comprising a plurality of labeled images. The labeled dataset is used to train one or more supervised ML models to estimate the identifiers of one or more of the items.

According to a third aspect of the present invention there is provided a computer implemented method of automatically producing a labeled dataset for training a supervised ML model to identify items purchased in a store, comprising using one or more processors for:
  Receiving a plurality of images captured by one or more imaging sensors deployed to monitor a POS in a store in which a plurality of items are offered for sale. The POS comprising a POS reader configured to read an identifier of each of the plurality of items checked out at the POS.
  Detecting one or more of the plurality items while checked out at the POS by analyzing one or more of the plurality of images.
  Correlating between one or more detected items and respective identifiers received from the POS reader according to a timestamp of the identifiers read event received from the POS reader.
  Labeling each of the plurality of images which depicts one of the detected item(s) with the respective identifier.
  Outputting a labeled dataset comprising a plurality of labeled images. The labeled dataset is used to train one or more supervised ML models to estimate the identifiers of one or more of the items.

According to a fourth aspect of the present invention there is provided a computer implemented method of estimating identity of items picked up in a store using a supervised ML model trained with an automatically generated labeled dataset, comprising using one or more processors for:

Receiving one or more images captured by one or more imaging sensors deployed to monitor a store in which a plurality of items offered for sale. One or more of the images depict at least partially one or more of the plurality of items which is picked up by one or more customers tracked in the store.

Estimating a respective identifier of one or more of the items by applying one or more trained supervised ML models to one or more of the images to correlate the image(s) with the respective identifier(s). The trained supervised ML model(s) is trained using a labeled dataset comprising a plurality of labeled images captured in the store and depicting the item. The plurality of labeled images are labeled automatically at a POS with the respective identifier during one or more checkout events by correlating between the labeled images and the respective identifiers according to readings of a POS reader deployed at the POS. The readings comprising a respective identifier of each checked out item checked out at the POS and a timestamp of the respective identifier read event.

Outputting the respective identifiers of one or more of the items.

According to a fifth aspect of the present invention there is provided a system, for estimating identify of items picked up in a store using a supervised ML model trained with an automatically generated labeled dataset, comprising one or more processors executing a code. The code comprising:

Code instructions to receive one or more images captured by one or more imaging sensors deployed to monitor a store in which a plurality of items offered for sale. One or more of the images depict at least partially one or more of the plurality of items which is picked up by one or more customers tracked in the store.

Code instructions to estimate a respective identifier of one or more of the items by applying one or more trained supervised ML models to one or more of the images to correlate the image(s) with the respective identifier(s). The trained supervised ML model(s) is trained using a labeled dataset comprising a plurality of labeled images captured in the store and depicting the item. The plurality of labeled images are labeled automatically at a POS with the respective identifier during one or more checkout events by correlating between the labeled images and the respective identifiers according to readings of a POS reader deployed at the POS. The readings comprising a respective identifier of each checked out item checked out at the POS and a timestamp of the respective identifier read event.

Code instructions to output the respective identifiers of one or more of the items.

In a further implementation form of the first, second and/or third aspects, one or more of the supervised ML models comprise a neural network.

In a further implementation form of the first, second and/or third aspects, the POS reader reads the identifier of each checked out item using a barcode scanner, a QR code scanner, a Radio Frequency ID (RFID) reader and/or a manual typing device.

In a further implementation form of the first, second and/or third aspects, each of the plurality of images is determined to depict at least partially one or more of the items based on image analysis of the respective image.

In a further implementation form of the first, second and/or third aspects, one or more of the items picked up by one or more of the tracked customers are identified in the store using one or more detection algorithms applied to at least some of the plurality of images to identify one or more of the tracked customers and one or more interactions of the tracked customer(s) with the item(s). The interactions comprise picking up one or more items, discarding one or more items, placing one or more items in a shopping cart, removing one or more items from the shopping cart, placing one or more items in a shopping bag, removing one or more items from the shopping bag, carrying one or more items and/or transferring one or more items to another person.

In a further implementation form of the first, second and/or third aspects, a performance of one or more of the supervised ML models trained to identify one or more of the items with a first subset of labeled images of the labeled dataset is validated using a second subset of labeled images of the labeled dataset and tested using a third subset of labeled images of the labeled dataset. The first subset, the second subset and the third subset each comprise different labeled images of the labeled dataset.

In an optional implementation form of the fourth and/or fifth aspects, one or more of the supervised ML models are applied to produce a feature vector for one or more unsupported items which the supervised ML model(s) is not trained to identify. The feature vector of each unsupported item is mapped with respect to a plurality of feature vectors of at least some items that the one or more supervised ML model is trained to identify in order to calculate an estimated identifier of one or more of the unsupported items according to the mapping.

In a further implementation form of the fourth and/or fifth aspects, the estimated identifiers of one or more of the items are added to a shopping list created for one or more of the tracked customers. The shopping list comprising the respective identifier of each item picked up in the store by a respective tracked customer.

In an optional implementation form of the fourth and/or fifth aspects, one or more items discarded by a respective tracked customer are removed from the shopping list the respective identifiers of.

In an optional implementation form of the fourth and/or fifth aspects, performance of one or more of the trained supervised ML model is measured by comparing between the shopping list created for one or more of the tracked customers and respective checkout lists created during checkout events of one or more of the tracked customers. Each checkout list comprising a respective identifier of each checked out item read by the POS reader during a respective checkout event.

In a further implementation form of the fourth and/or fifth aspects, the performance of the at least trained supervised ML model is evaluated based on one or more Key Performance Indicators (KPI) measured for the comparison. The KPIs comprise a percentage of false positive estimations, a percentage of false negative estimations, a percentage of incorrect estimations of a number of items in one or more shopping lists and/or mapping of incorrect single item estimations of one item as another.

In an optional implementation form of the fourth and/or fifth aspects, the performance of one or more of the trained supervised ML models is evaluated by applying one or more of the KPIs to one or more subsets of the plurality of items. Each subset includes items sharing one or more product attributes.

In an optional implementation form of the fourth and/or fifth aspects, one or more of the correlated images are labeled with a respective identifier of one or more items whose identifiers are correctly estimated and using one or more of the correlated images as additional dataset for further training one or more of the supervised ML models.

In an optional implementation form of the fourth and/or fifth aspects, in case a single false positive estimation of a first item and a single false negative estimation of a second item are detected in the shopping list, re-labeling each image in the dataset currently labeled with the identifier of the first item with the identifier of the second item.

In an optional implementation form of the fourth and/or fifth aspects, in case multiple false positive estimations of a first group of items and multiple false negative estimations of a second group of items are detected in the shopping list:
  Applying one or more item similarity estimation algorithms to map one or more of the items of the first group to respective items of the second group.
  Re-labeling each image currently labeled with the identifier of an item of the first group with the identifier of the respective item of the second group.

In an optional implementation form of the fourth and/or fifth aspects, statistics of one or more of the KPIs calculated for a plurality of shopping lists created for a plurality of tracked customers is analyzed to identify one or more erroneous estimation pattern of respective identifiers of one or more erroneously estimated items of the plurality of items and apply stratified sampling for one or more of the erroneously estimated items.

In an optional implementation form of the fourth and/or fifth aspects, one or more recommendations to improve estimation performance of one or more of the supervised ML models are generated automatically in case the supervised ML model(s) fails to correctly estimate respective identifiers of one or more of the items after the supervised ML model(s) is trained using a plurality of labeled images captured during the stratified sampling. The recommendations may relate to presentation of one or more of the items in the store, deployment of one or more of the imaging sensors and/or one or more operational parameters of one or more of the imaging sensors.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION OF SPECIFIC EMBODIMENTS OF THE INVENTION

Figure 1:
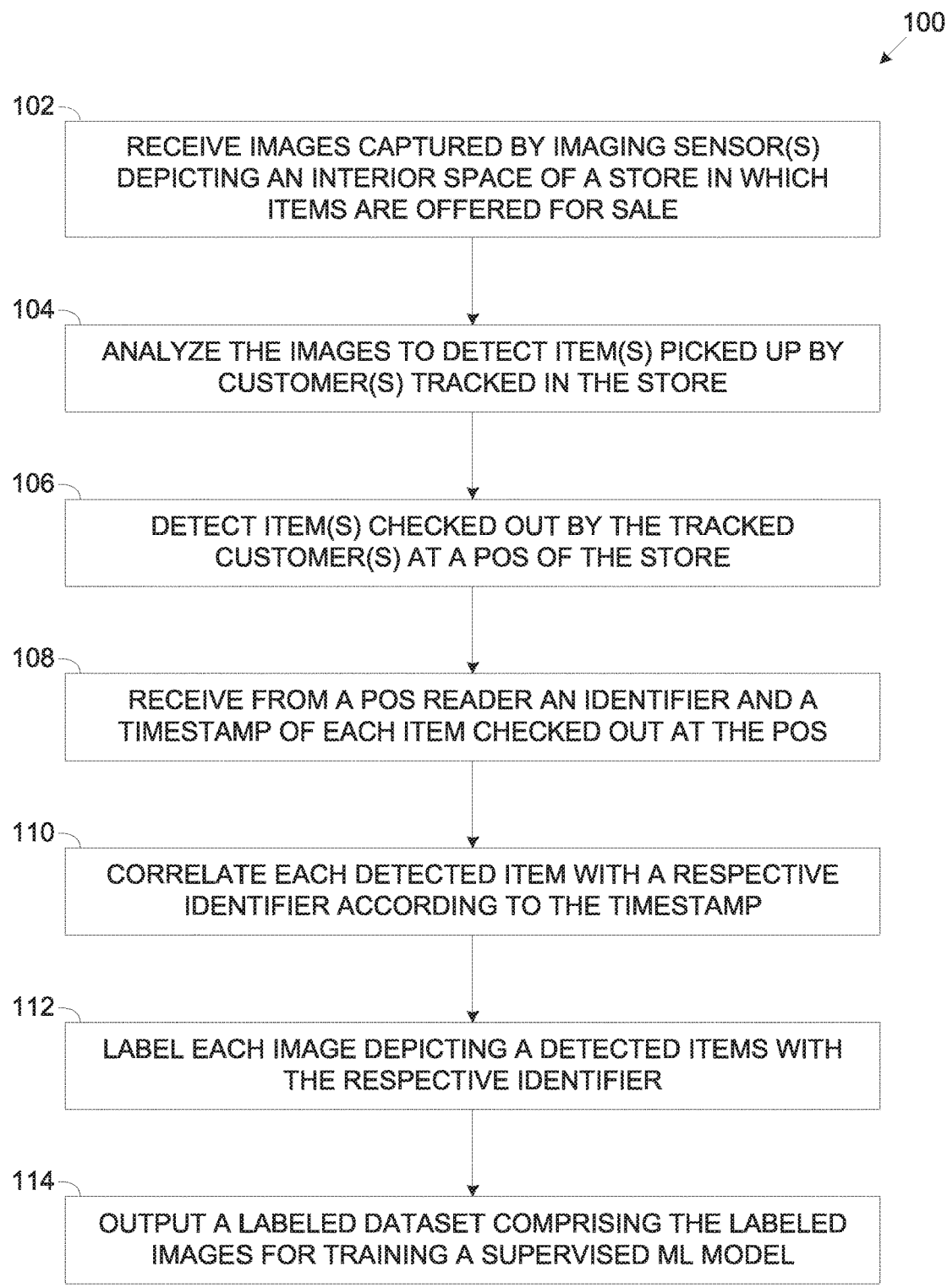
FIG. 1 is a flowchart of a first exemplary process of generating automatically a labeled dataset for training a supervised ML model to identify items offered for sale in a store, according to some embodiments of the present invention.

The present invention, in some embodiments thereof, relates to creating a labeled dataset for training a Machine Learning (ML) model to identify items offered for sale in a store, and, more specifically, but not exclusively, to creating automatically a labeled dataset for training a supervised ML model to identify items offered for sale in a store based on item identification at the store's checkout POS.

According to some embodiments of the present invention, there are provided methods, systems and computer program products for generating a labeled (tagged) dataset comprising a plurality of image samples automatically labeled with identifiers of items offered for sale in a store, the labeled dataset is used for training one or more supervised ML models to identify the items. The supervised ML models may include, for example, a neural network such as, for example, a Convolutional Neural Network (CNN) and/or the like, a Support Vector Machine (SVM) and/or the like.

The automatic labeling (tagging) of the images is based on analyzing images depicting the store to detect items collected by customers and correlating the detected items with respective identifiers identified for the items by Point of Sale (POS) reader(s) deployed at POS(s) of the store. The POS reader(s), for example, a barcode scanner, a QR code scanner, a Radio Frequency ID (RFID) reader, a manual typing device (i.e. a register machine) and/or the like are configured to read the identifier of each item checked out (sold, registered, logged, etc.) for the customer at the POS(s). After corralling between the detected item and its respective identifier, each image captured in the store which is determined to depict one of the detected items may be labeled with the identifier of the respective detected item.

In some embodiments the images which are candidates for labeling are captured to depict interaction of one or more customers tracked in the store with one or more of the items offered for sale. In particular, the candidate images depict the tracked customers collecting the item(s), for example, picking up an item, carrying an item, placing an item in a shopping cart and/or in a shopping bag and/or the like.

Images depicting the POS area(s) may be analyzed to identify the tracked customers at the POS area(s) where the items picked up by the tracked customers are checked out, i.e., the identifiers of the items are read by one or more of the POS readers. The tracked customers may be associated with checkout events based on the identification of the tracked customers at the POS area(s) coupled with a timestamp assigned to the identifier(s) read by the POS reader during the respective checkout events. As such the identifier(s) read from item(s) in one or more of the checkout events may be correlated with the items picked up by the respective tracked customers.

This approach may be of particular benefit in single item sales in which the tracked customers pick up a single item in the store and check it out at the POS since a deterministic correlation may be done between the item and its respective identifier. Such single item sales are highly frequent in most stores, in particular, small stores, convenience stores and/or the like and may therefore serve to correlate the items checked out during the single item sale checkout events with their respective identifiers. However, in case of multiple items sales and checkout events, the images depicting the POS may be further analyzed to individually identify each checked out item and correlate it with a respective identifier received from the POS reader according to the timestamp of the received identifier.

In some embodiments the images which are candidates for labeling are captured during the checkout events at the POS area(s) where the identifiers of the checked out item(s) are read by the POS reader(s). During one or more checkout events, the images depicting the POS area(s) may be analyzed to identify items checked out during the respective checkout event. The detected checked out items may be correlated with their respective identifier(s) read by the POS reader(s) according the timestamp assigned to the identifier(s) by the POS reader(s).

After correlating an item with its respective identifier, each captured image which is determined to depict the item may be labeled with the respective identifier and may be added to the labeled dataset which may be used for training the supervised ML model(s) to identify the items offered for sale in the store.

The trained supervised ML model(s) may be applied to estimate the identifiers (identity) of items collected (picked up) by customers in the store by applying the trained supervised ML model(s) to images depicting interaction of the customers with the items to identify the items picked up by the customers.

Optionally, one or more items which are unsupported by the trained supervised ML model(s) may be identified by mapping their feature vector(s) generated by the trained supervised ML model(s) with respect to the feature vectors of the supported items. An unsupported item is an item for which no labeled data (images) is available and the trained supervised ML model(s) is therefore not trained to identify. However, by mapping their feature vector(s) and measuring their distance(s) from feature vector(s) of supported item(s), the identifier(s) of the unsupported item(s) may be inferred.

Identifying the items picked up by customers may support checking out items picked up by the customers without requiring the customers to go through a traditional check out process in which the identifier of each picked up item needs to be read by the POS reader. Instead, the items collected by the customers are identified while picked up and automatically checked out when the customers leave (exit) the store.

Automatically generating the labeled dataset for training the supervised ML model(s) may present major advantages and benefits compared to currently existing methods and system for generating labeled datasets.

First, automatically labeling the images may yield a significantly more extensive and diverse labeled dataset comprising an extremely large number of image samples compared to existing methods which may apply manual techniques for identifying the content of images and labeling the images accordingly. Training, validating and testing the supervised ML model(s) using the extensive and diverse labeled dataset may significantly improve the performance, accuracy and/or quality of the supervised ML model(s) to identify the items in the store.

Moreover, automatically creating the labeled dataset may significantly reduce the labeled dataset creation effort and/or time compared to the manual labeling thus significantly reducing costs.

Furthermore, capturing the images of the items and automatically labeling these images to automatically create the labeled dataset may require no additional resources since it may be done using the existing equipment already deployed in the store, for example, the imaging sensors, the POS readers and/or the like as may be required for the existing methods. Moreover, the automatic generation of the labeled dataset may be done while the store is operated normally with real customers shopping in the store. This may significantly reduce complexity, cost and/or effort for simulating shopping scenarios which may prevent operating the store normally as may be done for the existing methods.

The described advantages are dramatically increased for stores in which the items catalog is constantly changing (e.g. on daily basis) to include new items and/or remove items. Manually labeling the images to create the labeled dataset for such scenarios may be impractical and probably impossible. In contrast, this challenge may be efficiently, rapidly and cost effectively resolved by the automatic creation of the labeled dataset which is done automatically while the store is fully operational and may encompass huge numbers of items.

According to some embodiments of the present invention, there are provided methods, systems and computer program products for enhancing the labeled dataset in order to improve performance and/or accuracy of one or more of the trained supervised ML models. The labeled dataset may be enhanced based on evaluation of the items estimations made by the trained supervised ML model(s) compared to the items actually collected by the customers as identified by the POS reader(s) during checkout events of the customers.

The performance may be evaluated based shopping lists created for customers tracked in the store. Each shopping list may list the identifiers estimated by the trained supervised ML model(s) for each item picked up by the respective tracked customer. Moreover, each item which is discarded by the respective customer may be removed from his shopping list such that the when reaching the POS area, the shopping list includes only items that are detected as picked up by the respective customer. During the checkout events of the tracked customers, checkout lists may be crated to list the identifiers of the items checked out for the tracked customers as read by the POS reader(s).

The estimation performance, accuracy and/or quality of the trained supervised ML model(s) may be then evaluated based on the comparison between the shopping lists comprising he estimated identifier(s) of the picked up items and the respective checkout list comprising the actual (real) identifiers of the picked up items.

One or more Key Performance Indicators (KPI) may be calculated for the shopping list compared to the checkout list, for example, a percentage of false positive estimations, a percentage of false negative estimations, a percentage of incorrect estimations of a number of items in the shopping list, a mapping (matrix) of incorrect single item estimations of one item as another item and/or the like.

Analyzing the KPIs may reveal one or more erroneous estimations and/or erroneous estimation patterns of the trained supervised ML model(s) and the trained supervised ML model(s) may be subject to additional training using an enhanced labeled dataset in order to overcome their erroneous estimation behavior. For example, in case the trained supervised ML model(s) systematically swaps between the identifiers of two items, the labeled images associated with the first item may be re-labeled with the identifier of the second item and vice versa. The re-labeled images may be added to the enhanced labeled dataset which may be used for further training the trained supervised ML model(s).

Moreover, a statistic analysis may be conducted on the KPIs to detect further erroneous estimation pattern(s) of the identifier of one or more erroneously estimated items. Based on the statistics analysis, stratified sampling may be initiated to enhance the labeled dataset with additional images depicting the erroneously estimated items and labeled with the identifiers of the erroneously estimated items. The enhance labeled dataset may be used to conduct additional training sessions to further train the trained supervised ML model(s) in order to improve their estimation performance and/or accuracy. For example, assuming the trained supervised ML model(s) 520 fails to accurately and/or consistently estimate the identifier of a certain item. In such case, further (stratified) sampling of the certain item may be done to capture additional images depicting the certain item. The additional images may be added to the enhanced labeled dataset which may be used to further train the trained supervised ML model(s). Moreover, the stratified sampling may be conducted under one or more of a plurality of environmental parameters, for example, a time of day, occupancy (number of customers) in the store and/or the like.

Optionally, based on one or more of the calculated KPIs and/or based on the statistics analysis, one or more recommendations may be automatically generated for improving the estimation performance of the trained supervised ML model(s). The recommendations may relate to one or more aspects of the items and/or of the images captured to depict the items, for example, presentation of the items in the store, deployment of the imaging sensor(s), one or more operational parameters of the imaging sensor(s) and/or the like.

Using one or more of the calculated KPIs, the performance, accuracy and/or quality of the trained supervised ML model(s) may be evaluated over time, for example, following additional training with enhanced labeled dataset(s), following changes to the imaging sensors, adjustments to the supervised ML model(s) and/or the like.

Enhancing the labeled dataset to and using the enhanced labeled dataset for further training the supervised ML model(s) may present major advantages and benefits compared to existing methods for training supervised ML model(s).

First, the enhanced labeled dataset automatically created after the supervised ML model(s) are trained and deployed in the store may be used for further training of the trained supervised ML model(s) thus significantly improving their estimation (prediction) performance, accuracy and/or quality. This may be of particular advantage for stores in which the items catalog is constantly changing (e.g. on daily basis) to include new items and/or remove items. Manually labeling the images to create the labeled dataset for such scenarios as may be done by the existing methods may be impractical and probably impossible. The labeled dataset automatic creation on the other hand is naturally automatic and may be done while the store is fully operational thus imposing not impacting store revenues. The supervised ML model(s) which may be further trained with the enhanced labeled dataset may adapt to the frequent updates of the items catalog. supervised ML model(s)

Moreover, establishing and measuring valid KPIs may be essential for effectively and reliably evaluating the estimation (prediction) performance, accuracy and/or quality of the trained supervised ML model(s). Establishing and measuring such KPIs may be even more crucial for complex supervised ML model(s), such as, for example, deep neural networks which internal workings are practically impossible for humans to understand.

Furthermore, using the labeled dataset enhanced with the stratified sampling for further training the trained supervised ML model(s) may significantly improve the performance, accuracy and/or quality of the trained supervised ML model(s) estimations. Supervised ML models may typically be trained to estimate (predict) items which are represented in the training dataset. A frequent problem in creating such models is that rare cases (items) may not be sufficiently represented in the training dataset. The supervised ML model(s) trained with the limited training dataset may therefore fail to accurately estimate and predict such items. The naive approach for dealing with this limitation which may be employed by some of the existing methods is to increase the training dataset. However, this approach may involve major effort and/or time which may translate to increased cost as the supervised ML model(s) need to be trained and tuned using a significantly larger training dataset. In contrast, detecting items which the supervised ML model(s) fails to accurately identify and applying stratified sampling to enhance the labeled dataset to include additional image samples of these items may ensure sufficient and effective representation of all items in training dataset.

In addition, the estimation performance, accuracy and/or quality of the trained supervised ML model(s) may be constantly improved after deployed in the store using the constantly enhanced labeled dataset, in particular for items which the trained supervised ML model(s) fails to accurately estimate.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer Program code comprising computer readable program instructions embodied on a computer readable medium may be transmitted using any appropriate medium, including but not limited to wireless, wire line, optical fiber cable, RF, etc., or any suitable combination of the foregoing.

The program code for carrying out operations for aspects of the present invention may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The program code can be downloaded to respective computing/processing devices from a computer readable storage medium or to an external computer or external storage device via a network, for example, the Internet, a local area network, a wide area network and/or a wireless network.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 is a flowchart of a first exemplary process generating automatically a labeled dataset for training a supervised ML model to identify items offered for sale in a store, according to some embodiments of the present invention. An exemplary process 100 may be executed for generating automatically a labeled dataset comprising a plurality of images each labeled with a respective identifier of a respective one of a plurality of items offered for sale in a store. In particular, the process 100 is based on tracking customers in the store and analyzing images depicting interaction of the tracked customers with items the items offered for sale in the store, specifically picking up items to detect the items in the images. The tracked customers are further identified at one or more POS areas of the store where the items they picked up are checked out (sold, registered) and are correlated with respective identifiers read from the checked out items by one or more readers deployed at the POS areas.

A plurality of images captured in the store, specifically in an interior space of the store may be analyzed to detect one or more of the items which are picked up by one or more customers tracked in the store. During checkout of one or more of the tracked customers at a POS area of the store, one or more of the detected items may be correlated with identifiers of the items received from one or more POS readers configured to read the identifier of each checked out item.

One or more of the captured images each depicting any one of the correlated items may be labeled with the identifier of the respective item and added to a labeled dataset which may be used to train one or more supervised ML models, for example, a neural network, an SVM and/or the like to identify the detected items.

Figure 2:
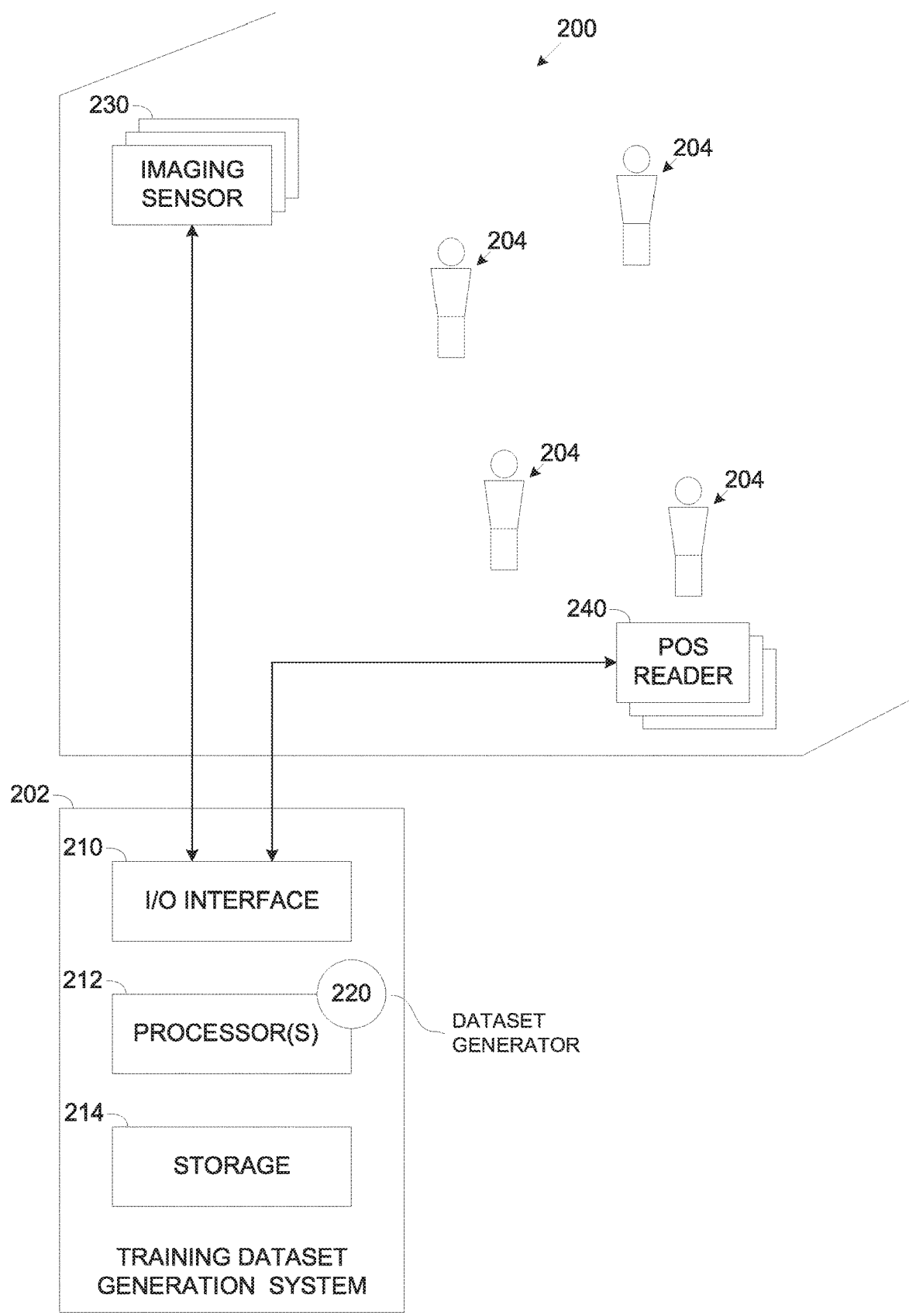
FIG. 2 is a schematic illustration of an exemplary system for generating automatically a labeled dataset for training a supervised ML model to identify items offered for sale in a store, according to some embodiments of the present invention.

Reference is also made to FIG. 2, which is a schematic illustration of an exemplary system for generating automatically a labeled dataset for training a supervised ML model to identify items offered for sale in a store, according to some embodiments of the present invention. An exemplary training dataset generation system 202 may execute the process 100 to generate automatically a labeled dataset for training one or one or more supervised ML models to identify one or more items offered for sale in a store 200.

The training dataset generation system 202 may include an Input/Output (I/O) interface 210, a processor(s) 212 for executing the process 100 and storage 214 for storing code (program store) and/or data.

The I/O interface 210 may include one or more wired and/or wireless network interfaces for connecting to one or more networks, for example, a Local Area Network (LAN), a Wide Area Network (WAN), a Metropolitan Area Network (MAN), a cellular network, the internet and/or the like. The I/O interface 210 may further include one or more wired and/or wireless interconnection interfaces, for example, a Universal Serial Bus (USB) interface, a serial port, a Controller Area Network (CAN) bus interface and/or the like.

The training dataset generation system 202 may communicate via the I/O interface 210 with one or more imaging sensors 230, for example, a camera, a video camera and/or the like deployed to monitor the store 200. The imaging sensor(s) 230 may be deployed in the store 200 to detect and track one or more customers 204 which may enter the store 200, exit the store 200, move in the interior space of the store 200, interact with one or more of the items offered for sale in the store 200, check out items they wish to purchase and/or the like.

Via the I/O interface 210, the training dataset generation system 202 may further communicate with one or more POS readers 240 deployed at one or more POS areas of the store 200 where the item(s) offered for sale in the store 200 which are picked up by one or more customers 204 may be checked out (registered as sold). The POS reader 240 may be therefore configured to read (extract) an identifier (ID) of each item which is checked out at the POS for one or more of the customers 204 and hence checked out of the store 200. Communicating with the POS reader(s) 240, the training dataset generation system 202 may receive from the POS reader(s) 240 the identifier read for each item checked out at the POS area(s) typically with a timestamp indicating the time of the ID read event.

The POS reader(s) 240 may include, for example, a barcode scanner, a QR code scanner, an RFID reader, a weight sensor, a manual typing device (i.e. a register machine) operated by a cashier and/or the like. For example, a barcode scanner deployed at the POS may be operated by the cashier and/or by one or more of the customer 204 to scan a barcode printed on each of one or more of the items. The barcode reader is configured to extract the respective ID of the respective checked out item from the scanned barcode. In another example, an RFID reader deployed at the POS may be configured to receive (intercept) the respective ID of each of one or more items comprising a transmitter configured to transmit the respective ID. The RFID reader is configured to extract the respective ID of the respective checked out item from the received transmission.

The processor(s) 212, homogenous or heterogeneous, may include one or more processing nodes arranged for parallel processing, as clusters and/or as one or more multi core processor(s). The storage 214 may include one or more non-transitory persistent storage devices, for example, a hard drive, a Flash array and/or the like. The storage 214 may also include one or more volatile devices, for example, a Random Access Memory (RAM) component and/or the like. The storage 214 may further include one or more network storage resources, for example, a storage server, a Network Attached Storage (NAS), a network drive, and/or the like accessible via one or more networks through the I/O interface 210.

The processor(s) 212 may execute one or more software modules such as, for example, a process, a script, an application, an agent, a utility, a tool, an Operating System (OS) and/or the like each comprising a plurality of program instructions stored in a non-transitory medium (program store) such as the storage 214 and executed by one or more processors such as the processor(s) 212. For example, the processor(s) 212 may execute a dataset generator software module 220 for executing the process 100 to generate automatically a labeled dataset for training one or more ML models, in particular supervised ML model(s), for example, a neural network such as, for example, a CNN, etc., an SVM and/or the like. Trained with the labeled dataset, the supervised ML model(s) may be applied to identify one or more of the items offered for sale in the store 200.

The dataset generator 220 may optionally utilize one or more hardware elements for executing the process 100 and/or part thereof. Such hardware elements may include, for example, a circuit, a component, an Integrated Circuit (IC), an Application Specific Integrated Circuit (ASIC), a Field Programmable Gate Array (FPGA), a Digital Signals Processor (DSP), a Graphic Processing Units (GPU) and/or the like.

Optionally, the training dataset generation system 202, specifically the dataset generator 220 are provided and/or utilized by one or more cloud computing services, for example, Infrastructure as a Service (IaaS), Platform as a Service (PaaS), Software as a Service (SaaS) and/or the like provided by one or more cloud infrastructures, platforms and/or services such as, for example, Amazon Web Service (AWS), Google Cloud, Microsoft Azure and/or the like. In such case, the cloud based dataset generator 220 may communicate with the imaging sensor(s) 230 and the POS reader(s) 240 to receive the images captured by the imaging sensor(s) 230 and the output of the POS reader(s) 240, i.e. the identifiers of the checked out items typically with their respective timestamps.

As shown at 102, the process 100 starts with the dataset generator 220 receiving a plurality of images captured by one or more of the imaging sensors 230 deployed to monitor the store 200, specifically to monitor the interior space of the store 200. As such, one or more of the images may depict one or more items offered for sale in the store 200 which one or more of the customers 204 interacts with, for example, an item picked up by a customer 204, an item returned by a customer 204, an item carried by a customer 204, an item placed in a shopping cart, an item removed from a shopping cart, an item placed in a shopping bag, an item removed from a shopping bag, an item checked out at a POS area and/or the like.

As shown at 104, the dataset generator 220 may analyze the images to detect one or more of the items offered for sale in the store 200 which are picked up by one or more of the customers 204 detected moving in the store 200.

The dataset generator 220 may apply one or more detection algorithms, for example, an image processing based algorithm, an computer vision based algorithm, a detection ML model, a classifier and/or the like adapted, configured and/or trained to (visually) detect items as well as people, i.e. the customer(s) 204. The dataset generator 220 coupled with the detection algorithm(s) may determine whether each of the images actually depicts one or more items which the customer(s) 204 interacted with. For example, one or more items may be detected in one or more of the images by applying a bounding box for each item detected in one or more of the images. The dataset generator 220 may discard one or more of the images which do not depict any of the items and/or images which do not clearly depict one or more of the items captured in the image(s).

The detection algorithm(s) may be further adapted to support tracking of one or more of the customers 204 during the time the customer(s) 204 are located, moving and/or travelling in the store 200. For example, the detection algorithm(s) may be adapted to track the customer(s) 204 from the time of his entry into the store 200 to the time of his departure from the store 200, specifically to time of departure through one or more of the POS areas of the store 200. The detection algorithm(s) may be adapted to track the customer(s) 204 based on one or more detection techniques. For example, the detection algorithm(s) may apply face recognition to track one or more of the customers 204 throughout the store 200. In another example, the detection algorithm(s) may apply body and figure analysis to track one or more of the customers 204 throughout the store 200. In another example, the detection algorithm(s) may apply outfit (e.g. cloth, shoes, hat, etc.) analysis to track one or more of the customers 204 throughout the store 200.

Moreover, the detection algorithm(s) may be adapted to detect one or more interactions of one or more of the tracked customers 204 with one or more of the items offered for sale in the store 200. Such interaction may include, for example, picking up one or more items, discarding one or more items, placing (putting) one or more items in a shopping cart, removing one or more items from a shopping cart placing one or more items in a shopping bag, removing one or more items from a shopping bag, carrying (holding) one or more items, transferring one or more items to another person and/or the like.

As shown at 106, the dataset generator 220 may detect one or more items checked out at one or more POS areas of the store 200, i.e., items whose identifiers are read by one or more of the POS reader(s) 240 deployed at the POS area(s) for sale to the customer(s) 204 and are hence checked out of the store 200. In particular, the dataset generator 220 detects each checked out item in correlation with a respective tracked customer 204 who picked up the item in the store 200 and for whom the item is checked out. The dataset generator 220 may detect the checked out item(s) using one or more methods, techniques and/or implementations.

For example, the dataset generator 220 may detect the checked out item(s) based on analysis of one or more images received from one or more of the imaging sensors 230 deployed to monitor at least partially the POS area(s) of the store 200. The dataset generator 220, using the detection algorithm(s), may identify one or more of the tacked customers 204 when located at the POS area and may further detect one or more items which are checked out for the respective tracked customer 204. As such, when a tracked customer 204 arrives at the POS area where the item(s) he picked in the store 200 are checked out for him, the checked out items may be associated with the tracked customer 204.

In another example, the dataset generator 220 may detect the checked out item(s) based on their RFID transmission intercepted by the POS reader 230 deployed at the POS area while a tracked customer 204 passes through the POS area. As such, when a certain tracked customer 204 arrives at the POS area, the item(s) that the certain tracked customer 204 picked in the store 200 are detected and associated with the tracked customer 204. This may be of particular benefit and use in case the tracked customer 204 picked up a single item in the store 200 such that the detected item may be deterministically associated with the intercepted RFID.

As shown at 108, the dataset generator 220 may receive from the POS reader(s) 240 an identifier (ID) of each item checked out at the POS area(s) during a checkout event of one or more of the tracked customers 204. The dataset generator 220 may further receive a timestamp of each ID read event such that each identifier received by the dataset generator 220 is associated with a respective timestamp.

The timestamp may be an individual timestamp associated with a certain identifier and/or the timestamp may be a checkout timestamp associated with a certain checkout event in which multiple items may be checked out and hence the multitude of items may be associated with a single timestamp. This mainly depends on the operational parameters and/or capabilities of the POS reader(s) 240 deployed at the store 200. For example, one or more of the POS reader(s) 240 may output the timestamp indicating the time of each read event in which a certain identifier of a certain checked out item is read. As such each item identifier may be associated with a unique individual timestamp. However, one or more of the POS reader(s) 240 may be capable of outputting only the timestamp of the entire checkout event. For example, assuming the POS reader 230 includes the barcode scanner, the POS reader 230 may associate a unique timestamp with each scanned barcode. In another example, assuming the POS reader 230 includes the RFID reader, the POS reader 230 may associate a unique timestamp with each intercepted RFID transmission. In another example, one or more of the POS reader(s) 240 may include the manual typing device (register) which may be capable of outputting only the checkout event completion timestamp such that multiple checked out items may be associated with the same timestamp.

As shown at 110, for one or more of the checkout events, a respective tracked customer 204 may be identified in the at the POS area(s) by analyzing one or more images captured by one or more imaging sensors 230 deployed to monitor the POS area(s). Based on the identifying of the respective tracked customer at the POS area(s), the dataset generator 220 may correlate between the item(s) detected while picked up by the respective tracked customer 204 and the respective identifiers read by the POS reader(s) 240 during the checkout event of the respective tracked customer 204. In particular, the dataset generator 220 correlates between the items picked up by the tracked customers 204 and the identifiers of the checked out items according to the timestamps of the detection of the checked out items and the timestamps of the read identifiers.

For example, assuming the checked out items are identified based on the analysis of the image(s) captured at the POS area. Each of the POS images may be assigned with a timestamp. The timestamp may be assigned to one or more of the POS images by the imaging sensor(s) 230 which captured the respective POS image. However, the timestamp may be assigned to one or more of the POS image by the dataset generator 220 according to the reception time of the receptive POS image. In such case, the dataset generator 220 may associate a checked out item with a received identifier by matching the timestamp of the received identifier (assigned by the POS reader 230) and the timestamp of the POS image depicting the checked out item.

In another example, assuming the checked out items are identified based on their RFID transmission intercepted by RFID POS reader(s) 240 which further assign timestamps to the intercepted identifiers indicating time of interception. The dataset generator 220 may associate a checked out item with a received identifier by matching the timestamp of the received identifier and the timestamp of the POS image depicting a tracked customer 204 located at the POS area. Such as implementation may naturally best apply for checkout events in which only a single item is checked for tracked customers 204 such that the single item detected as picked up by a certain tracked customer 204 may be deterministically associated with the single identifier intercepted by the RFID POS reader(s) 240 when the certain tracked customer 204 is located and/or passes through he POS area.

As shown at 112, for each checked out item that is successfully correlated with a respective identifier, the dataset generator 220 may select one or more of the images which depict the respective correlated item. These selected images may include one or more images depicting the respective item while picked up, carried and/or handled by a respective tracked customer 204 and/or one or more images depicting the respective item during the checkout event. For each successfully correlated item, the dataset generator 220 may label each selected image with the respective identifier correlated with the respective item such that each selected image is labeled with the respective identifier of the item depicted in the respective image.

As shown at 114, the dataset generator 220 may output a labeled dataset comprising the labeled images associated with each of one or more of the items. The labeled dataset may be used to train one or more supervised ML models to estimate the identifier (i.e. the identity) of one or more of the items offered for sale in the store 200.

In some embodiments of the present invention, one or more of the supervised ML models are hosted and trained by one or more remote processing nodes. In such case, the dataset generator 220 may transmit the labeled dataset via the I/O interface 210 to one or more of the remote processing nodes hosting the supervised ML model(s). In another example, the dataset generator 220 may output the labeled dataset via the I/O interface 210 to one or more attachable devices, for example, an attachable storage device (e.g. USB storage device, etc.) which may be used to transfer the labeled dataset to one or more of the remote processing nodes hosting the supervised ML model(s). According to some embodiments of the present invention, one or more of the supervised ML models are hosted and trained by the training dataset generation system 202. In such case, the dataset generator 220 may locally store the labeled dataset in the storage 214 thus making it available for locally training the supervised ML model(s).

The labeled dataset may be used to train the supervised ML model(s) as known in the art. For example, the labeled dataset may be split to a plurality of subsets of labeled images each comprising different labeled images. The supervised ML model(s) may be trained with a first subset of the plurality of subsets and validated using a second subset of the plurality of subsets. Moreover, performance of the supervised ML model(s) may be tested using a third subset of the plurality of subsets.

Figure 3:
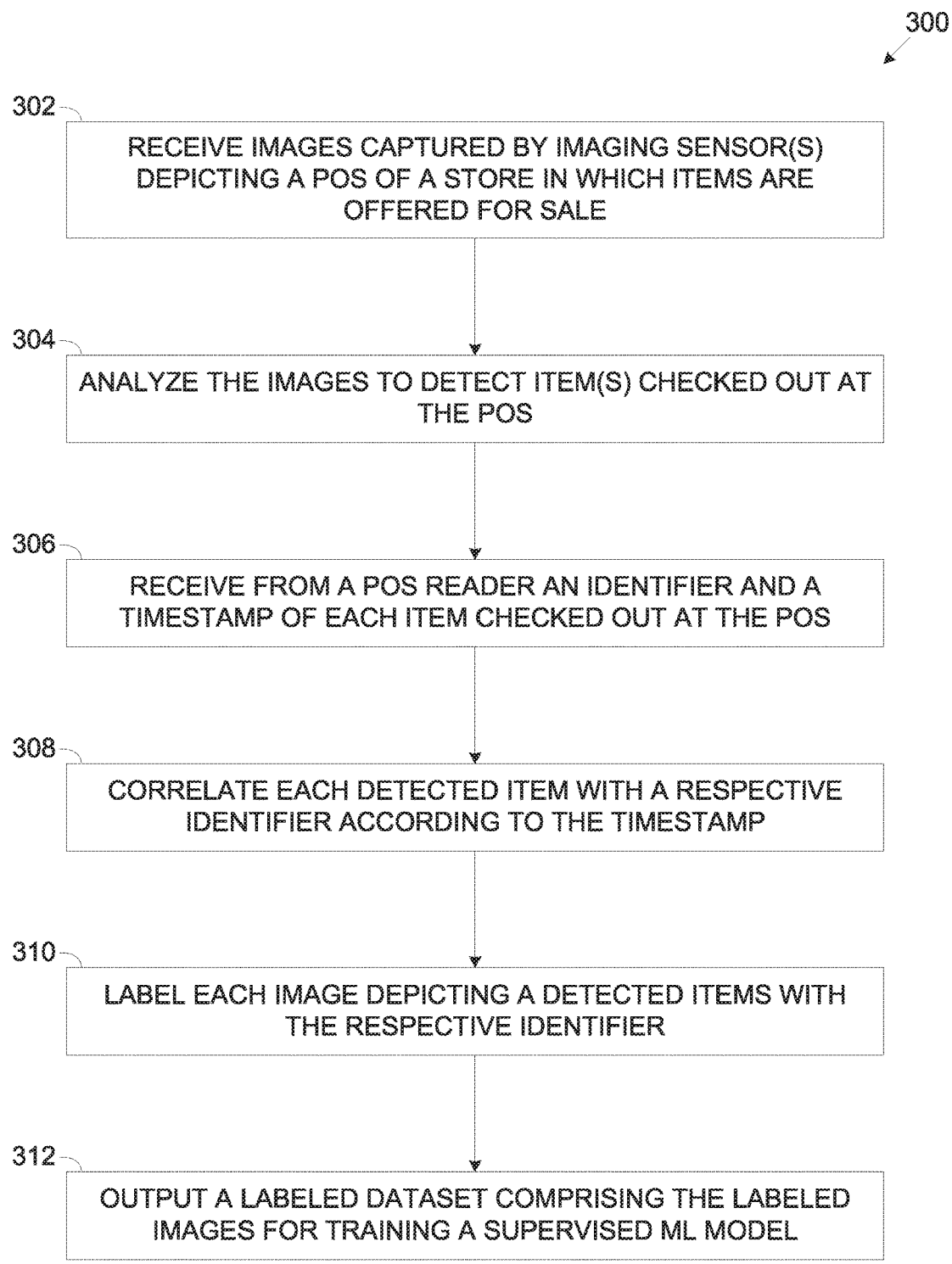
FIG. 3 is a flowchart of a second exemplary process of generating automatically a labeled dataset for training a supervised ML model to identify items offered for sale in a store, according to some embodiments of the present invention.

Reference is now made to FIG. 3, which is a flowchart of a second exemplary process generating automatically a labeled dataset for training a supervised ML model to identify items offered for sale in a store, according to some embodiments of the present invention. An exemplary process 300 may be executed by a training dataset generation system such as the training dataset generation system 202, in particular by a dataset generator such as the dataset generator 220 for generating automatically a labeled dataset comprising a plurality of images each labeled with a respective identifier of a respective one of a plurality of items offered for sale in a store such as the store 200. In particular, the process 300 is based on detecting items in images depicting the POS area(s) of the store 200 during checkout events and correlating detected checked out items with respective identifiers read from the checked out items by one or more readers deployed at the POS areas.

As shown at 302, the process 300 starts with the dataset generator 220 receiving a plurality of images captured by one or more of the imaging sensors 230 deployed to monitor the POS area(s) of the store 200. In particular, the images may depict items checked out at the POS area(s), i.e. items whose identifiers are read by one or more of the POS reader(s) 240 for sale to the customer(s) 204 and are hence checked out of the store 200.

As shown at 304, the dataset generator 220 may analyze the images to detect one or more of the items which are checked out at the POS. The dataset generator 220 may apply one or more detection algorithms as described in step 104 of the process 100 to detect the checked out items in one or more of the captured images. The dataset generator 220 may determine whether each of the images actually depicts one or more checked out items and may discard images which do not depict any of the checked out items and/or images which do not clearly depict one or more of the checked out items captured in the image(s).

As shown at 306, the dataset generator 220 may receive from the POS reader(s) 240 an identifier (ID) of each item checked out at the POS area(s) during a checkout event of one or more of the customers 204. The dataset generator 220 may further receive a timestamp of each ID read event such that each identifier received by the dataset generator 220 is associated with a respective timestamp.

As shown at 308, for one or more of the checkout events, the dataset generator 220 may correlate between the detected checked out item(s) and the respective identifiers read by the POS reader(s) 240 during the respective checkout event. In particular, the dataset generator 220 correlates between the items picked up by the tracked customers 204 and the identifiers of the checked out items according to the timestamps of the detection of the checked out items and the timestamps of the read identifiers.

To this end a timestamp is assigned to each image captured to depict the POS area(s), specifically to depict check out events of customers 204. The timestamp may be assigned to one or more of the images by the imaging sensor(s) 230 which captured the respective image and/or by the dataset generator 220 according to the reception time of the receptive image. The dataset generator 220 may therefore associate one or more of the detected checked out items with a respective identifier received from the POS reader(s) 240 for by matching the timestamp of the received identifier (assigned by the POS reader 230) and the timestamp of the image depicting the checked out item.

As shown at 110, for each checked out item that is successfully correlated with a respective identifier, the dataset generator 220 may select one or more of the images which depict the respective correlated item. For each successfully correlated item, the dataset generator 220 may label each selected image with the respective identifier correlated with the respective item such that each selected image is labeled with the respective identifier of the item depicted in the respective image.

As shown at 112, the dataset generator 220 may output a labeled dataset comprising the labeled images associated with each of one or more of the items. The labeled dataset may be used to train one or more supervised ML models to estimate the identifier of one or more of the items offered for sale in the store 200.

According to some embodiments of the present invention the items in the store 200 are identified by one or more of the supervised ML models trained with the labeled dataset automatically generated by the dataset generator 220 executing the process 100 and/or the process 300. In particular, the trained supervised ML model(s) are applied to identify the items picked up and collected by tracked customers such as the tracked customers 204 shopping in the store 200. As such the items collected by one or more of the tracked customers 204 may be checked out and the tracked customer(s) 204 may be charged for their collected items without the tracked customers 204 having to go through a checkout process at POS areas where the items need to be identified by the POS reader(s) 240.

Moreover, the identification performance and/or accuracy of one or more of the trained supervised ML models may be further enhanced by comparing between items collected by the tracked customer(s) 204 as detected by the supervised ML and the items actually collected by the tracked customer(s) 204 as identified by the POS reader(s) 240 during checkout event of the tracked customer(s) 204.

Figure 4:
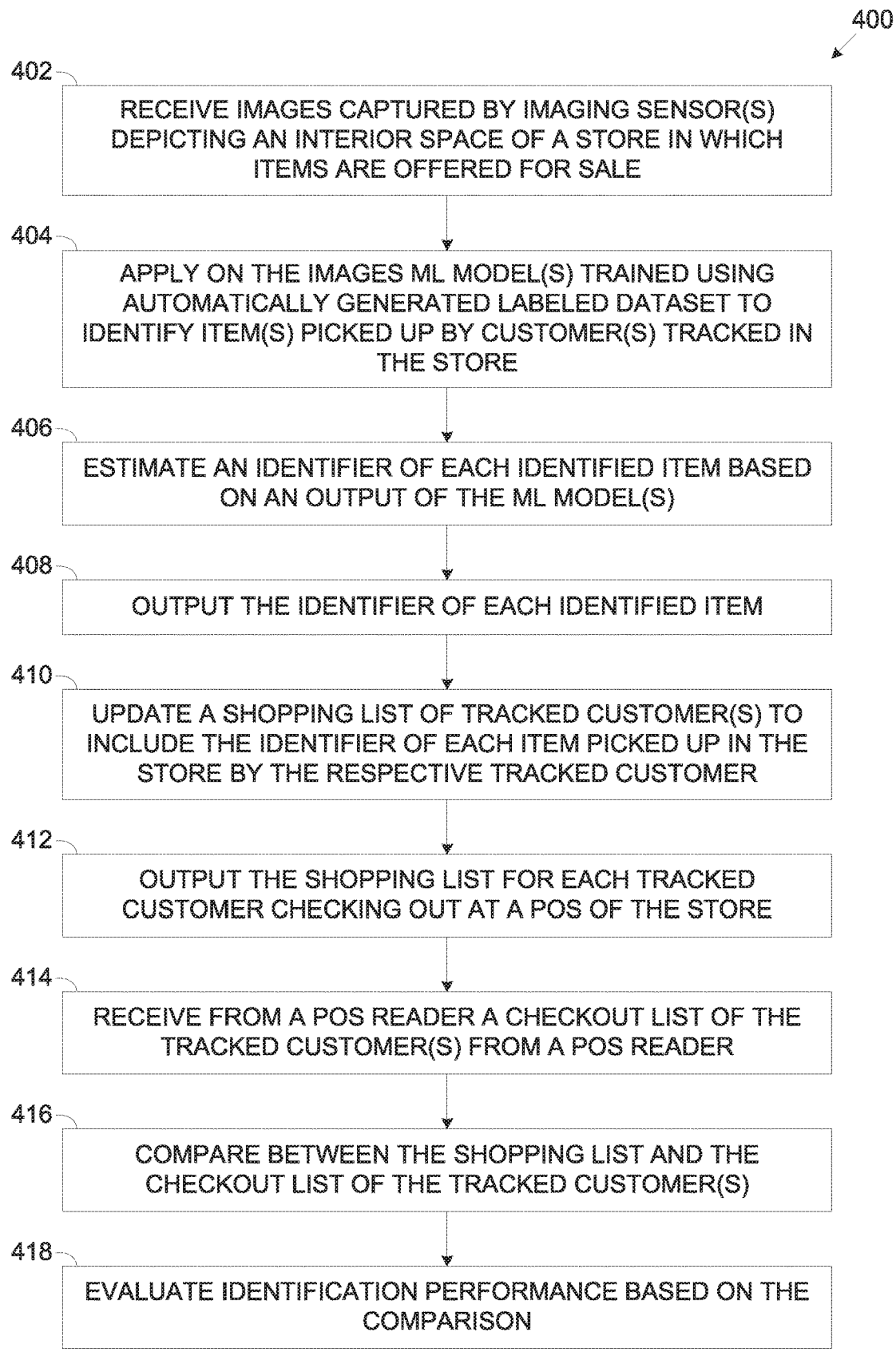
FIG. 4 is a flowchart of an exemplary process of identifying items offered for sale in a store using a supervised ML model trained using an automatically generated labeled dataset, according to some embodiments of the present invention.

Reference is now made to FIG. 4, which is a flowchart of an exemplary process of identifying items offered for sale in a store using a supervised ML model trained using an automatically generated labeled dataset, according to some embodiments of the present invention. An exemplary process 400 may be executed for identifying items offered for sale in a store such as the store 200 which are picked up (collected) by one or more customers such as the customers 204. Identification of the collected items is done using one or more supervised ML models, for example, a neural network, an SVM and/or the like trained with an automatically generated labeled dataset comprising a plurality of images each labeled with the identifier of one of the plurality of items offered for sale in the store 200.

Figure 5:
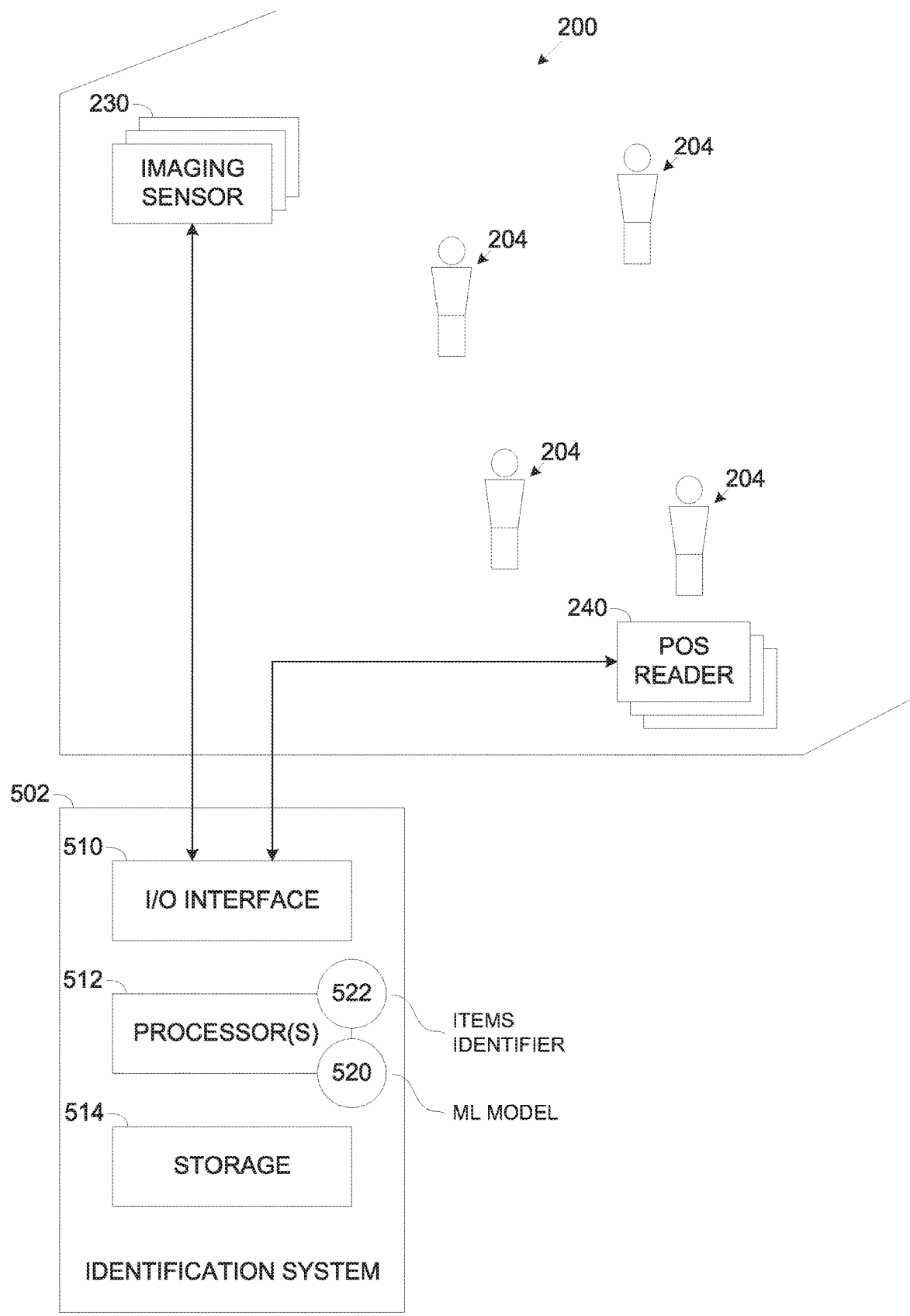
FIG. 5 is a schematic illustration of an exemplary system for identifying items offered for sale in a store using a supervised ML model trained using an automatically generated labeled dataset, according to some embodiments of the present invention.

Reference is also made to FIG. 5, which is a schematic illustration of an exemplary system for identifying items offered for sale in a store using a supervised ML model trained using an automatically generated labeled dataset, according to some embodiments of the present invention. An exemplary identification system 502 may execute the process 400 to identify items offered for sale in the store 200, in particular, to identify items picked up and collected by the customers 204 in the intention to purchase the collected items.

The identification system 502 may include an I/O interface 510 such as the I/O interface 210, a processor(s) 512 such as the processor(s) 212 for executing the process 400 and storage 514 such as the storage 214 for storing code (program store) and/or data.

The identification system 502 may communicate via the I/O interface 510 with one or more imaging sensors such as the imaging sensors 230 deployed to monitor the store 200. The imaging sensor(s) 230 may be deployed in the store 200 to detect and track one or more customers such as the customers 204 which may enter the store 200, exit the store 200, move in the interior space of the store 200, interact with one or more of the items offered for sale in the store 200, check out items they wish to purchase and/or the like.

Via the I/O interface 510, the identification system 502 may further communicate with one or more POS readers such as the POS readers 240 deployed at one or more POS areas of the store 200. The POS reader(s) 240 may be configured to read the identifier of each item which is checked out at the POS for one or more of the customers 204 and hence checked out of the store 200. The identification system 502 may receive from the POS reader(s) 240 the identifiers read for each item checked out at the POS area(s) typically with a timestamp indicating the time of the ID read event.

The processor(s) 512 may execute one or more software modules for example, one or more supervised ML models 520, for example, a neural network (e.g. a CNN), an SVM and/or the like trained to identify the items offered for sale in the store 200. The processor(s) 512 may further execute an items identifier 522 for executing the process 400 to identify items offered for sale in the store 200 which are picked up and collected by one or more of the customers 204.

The supervised ML model(s) 520 and/or the items identifier 522 may optionally utilize one or more hardware elements for executing the process 100 and/or part thereof. Such hardware elements may include, for example, a circuit, a component, an IC, an ASIC, an FPGA, a DSP, a GPU and/or the like.

Optionally, the identification system 502, one or more of the supervised ML models 520 and/or the items identifier 522 are provided and/or utilized by one or more of the cloud computing services, for example, IaaS, PaaS, SaaS and/or the like provided by one or more of the cloud infrastructures, platforms and/or services. In such case, the cloud based dataset generator 220 may communicate with the imaging sensor(s) 230 and optionally with the POS reader(s) 240 to receive the images captured by the imaging sensor(s) 230 and the output of the POS reader(s) 240, i.e. the identifiers of the checked out items typically with their respective timestamps.

As shown at 402, the process 400 starts with the items identifier 522 receiving a plurality of images captured by one or more of the imaging sensors 230 deployed to monitor the store 200, specifically to monitor the interior space of the store 200. As such, one or more of the images may depict one or more items offered for sale in the store 200 which one or more of the customers 204 interacts with, for example, an item picked up by a customer 204, an item returned by a customer 204, an item carried by a customer 204, an item placed in a shopping cart, an item removed from a shopping cart, an item placed in a shopping bag, an item removed from a shopping bag, an item checked out at a POS area and/or the like.

Moreover, the imaging sensors 230 may be deployed in the store 200 to support tacking one or more of the customers 204 during their trip while travelling in the store 200 from the time of their entry into the store 200 to the time of their exit from the store 200.

As shown at 404, the items identifier 522 may apply one or more trained supervised ML models 520 on one or more of the images to identify one or more of the items that one or more of the customers 204 interact with. In particular, the supervised ML model(s) 520 applied by the items identifier 522 are trained using the labeled dataset generated according to the process 100 and/or the process 300 which comprises a plurality of images each labeled with a respective identifier of an item depicted in the image.

The items identifier 522 may further apply the trained supervised ML model(s) 520 in conjunction with one or more of the detection algorithms configured and/or trained to (visually) detect and track customer(s) 204 in the store 200. As described herein before, the detection algorithm(s) may be adapted to detect one or more of the interactions of one or more of the tracked customers 204 with one or more of the items offered for sale in the store 200, for example, picking up one or more items, discarding one or more items, placing one or more items in a shopping cart, removing one or more items from a shopping cart placing one or more items in a shopping bag, removing one or more items from a shopping bag, carrying one or more items, transferring one or more items to another person and/or the like.

The trained supervised ML model(s) 520 may output the identifier (identity) of each identified item typically with a probability value indicating a probability of a correct identification. The trained supervised ML model(s) 520 may further output a respective one of a plurality of feature vectors each created as known in the art each for a respective one of the supported items that the trained supervised ML model(s) 520 is trained to identify. The feature vector may include a plurality of features extracted from each labeled image which are descriptive of the respective item depicted in the image.

As shown at 406, based on the output of the trained supervised ML model(s) 520, the items identifier 522 may estimate the identifier of each item collected by one or more of the customers 204 tracked in the store 200.

Optionally, the items identifier 522 estimates the identifier (identity) of one or more unsupported (new) items offered for sale in the store 200 which the trained supervised ML model(s) is not trained to identify. The items identifier 522 may apply the trained supervised ML model(s) 520 on one or more images of one or more of the unsupported items and receive for each new item a respective feature vector created by the trained supervised ML model(s) 520. The items identifier 522 may map the feature vectors of the unsupported item(s) with respect to the plurality of feature vectors created by the trained supervised ML model(s) 520 for the supported items which the supervised ML model(s) 520 is trained to identify.

The items identifier 522 may then apply the trained supervised ML model(s) 520 over one or more images of an unsupported item and receive a respective feature vector. Based on the mapping of the feature vector(s) of the unsupported item(s) with respect to the feature vectors of the supported item(s), the items identifier 522 may estimate the identifier of the unsupported item. For example, the items identifier 522 may measure the distance between the feature vector(s) computed for one or more of the unsupported items and the feature vector(s) of one or more of the supported item(s). As such the items identifier 522 may estimate the identifiers of unsupported (new) items without re-training the trained supervised ML model(s) 520 to identify these unsupported items.

As shown at 408, the items identifier 522 may output the estimated identifier of each identified item collected by one or more of the tracked customers 204. Moreover, the items identifier 522 may correlate each identified item with the respective tracked customer 204 which picked the respective identified item.

As shown at 410, the items identifier 522 may create and update a shopping list for each of one or more of the tracked customers 204. The items identifier 522 may update each shopping list to include the identifier of each item collected by the respective tracked customer 204. The items identifier 522 may therefore add to the shopping list of each tracked customer 204 the identifier of each item detected as collected in the store 200 by the respective tracked customer 204. For example, in case a certain tracked customer 204 picks up a certain item, the items identifier 522 may add the identifier of the certain item to the shopping list of the certain tracked customer 204. In another example, in case a certain tracked customer 204 puts a certain item in his shopping cart, the items identifier 522 may add the identifier of the certain item to the shopping list of the certain tracked customer 204.

Complementary, the items identifier 522 may update each shopping list to reflect items discarded by the respective tracked customer 204. For example, in case a certain tracked customer 204 returns a certain item to its shelf, the items identifier 522 may remove (delete) the identifier of the certain item from the shopping list of the certain tracked customer 204. In another example, in case a certain tracked customer 204 removes a certain item from his shopping bag, the items identifier 522 may remove (delete) the identifier of the certain item from the shopping list of the certain tracked customer 204.

As shown at 412, the items identifier 522 may output the shopping list of one or more of the tracked customers 204. In particular, the identifier 522 may output the shopping list in correlation with the respective tracked customer 204 such that the items collected by each tracked customer 204 are correlated with the respective tracked customer 204.

As shown at 414, during the checkout event of one or more of the tracked customers 204 at the POS area(s) of the store 200, the items identifier 522 may receive from the POS reader(s) 240 a checkout list created for the respective tracked customer 204. The checkout list may include the identifiers of all the items checked out for the respective tracked customer 204. The items identifier 522 may further receive the timestamp of each checked out item and/or the timestamp of the checkout event. For example, assuming the POS reader(s) 240 includes the barcode scanner operated by the respective tracked customer 204 or by a cashier, the barcode scanner may output a list of the items whose barcodes are scanned during the checkout event of the respective tracked customer 204. In another example, assuming the POS reader(s) 240 includes the RFID reader deployed at the exit of the store 200, the RFID reader may output a list of the items whose identifier transmission is intercepted by the RFID reader during the checkout event of the respective tracked customer 204.

As shown at 416, for one or more of the checkout events, the items identifier 522 may compare between the shopping list and the checkout list created for the respective tracked customer 204. The items identifier 522 may identify the tracked customer 204 which is engaged in a current checkout event based on analysis of one or more images depicting the POS area(s). Based on the matching the timestamp received from the POS reader(s) 240 for the checkout event and the timestamp of the image(s) depicting the tracked customer 204 in the POS area(s), the items identifier 522 may associate the tracked customer 204 with a respective checkout list. The items identifier 522 may then compare between the shopping list created for one or more of the tracked customers 204 while travelling in the store 200 and the checkout list created at the POS area for the respective tracked customer 204.

As shown at 418, the items identifier 522 may evaluate, measure and/or estimate a performance and/or the accuracy of the identification of the items by the trained supervised ML model(s) 520 based on the comparison between the shopping list and the checkout list created for one or more of the tracked customers 204 since the shopping list indicates the item(s) estimated to be picked up (collected) by the tracked customer(s) 204 while the checkout list indicates the item(s) actually collected by the tracked customer(s) 204.

The items identifier 522 may evaluate the performance of the items identifier estimation of the trained supervised ML model(s) 520 based on one or more KPIs calculated for the comparison between the shopping list and the checkout list created for one or more of the tracked customers 204. The KPIs may include, for example, a percentage of false positive estimations, a percentage of false negative estimations, a percentage of incorrect estimations of a number of items in the shopping list, a mapping (matrix) of incorrect single item estimations of one item as another item and/or the like.

Moreover, the items identifier 522 may compute one or more of the KPIs to evaluate the performance of the trained supervised ML model(s) 520 for one or more subsets of the plurality of items offered for sale in the store 200. Specifically, such subsets of items may comprise items sharing one or more product attributes and hence may present an identification estimation challenge for the trained supervised ML model(s) 520. Such product attributes of the items may include, for example, size, color, shape, display location, pickup time and/or the like. The items subsets may therefore include, for example, a subset of small items, a subset of items of a certain color, a subset of items displayed at certain display areas in the store 200, a subset of items purchased during various lighting conditions and/or the like. The subsets of items may further relate to characteristics, attributes and/or parameters of the customers 204 and/or of shopping sessions conducted by the customers 204 in the store 200. For example, a certain subset of items may include items purchased by a certain type of customers 204 (e.g. children, elderly people, families, etc.). In another example, a certain subset of items may include items purchased by customers 204 during a certain time of the day (e.g. morning, evening, etc.). In another example, a certain subset of items may include items purchased by customers 204 while the store 200 is crowded.

Optionally, the items identifier 522 instructs re-labeling at least some labeled images in the labeled dataset with other labels in case the trained supervised ML model(s) 520 erroneously estimate the identifiers of one or more items. For example, assuming the items identifier 522 determines that in one or more of the shopping lists include a single false positive estimation of a certain (first) item and a single false negative estimation of another (second) item compared the respective checkout list(s). The items identifier 522 may therefore estimate that the trained supervised ML model(s) 520 swaps between the first item and the second item. In such case, the items identifier 522 may enhance the labeled dataset by re-labeling the set of images, originally labeled with the identifier of the first item, with the identifier of the second item. Complementary, the items identifier 522 may instruct re-labeling the set of images, originally labeled with the identifier of the second item, with the identifier of the first item. In another example, assuming the items identifier 522 determines that in one or more of the shopping lists include multiple false positive estimations of several items (first group) and multiple false negative estimations of other items (second group) compared the respective checkout list(s). The items identifier 522 may apply one or more item similarity estimation algorithms to map one or more items of the first group to a respective item(s) of the second group. The items identifier 522 may thus enhance the labeled dataset by re-labeling one or more sets of images, originally labeled with the identifiers of items of the first group, with the identifiers of the respectively mapped item(s) of the second group.

Optionally, the labeled dataset is enhanced with one or more images of one or more items which are accurately estimated by the trained supervised ML model(s) 520. Assuming that, based on the comparison between one or more shopping lists and their respective checkout lists, the items identifier 522 determines that a certain item is accurately estimated by the trained supervised ML model(s) 520. The items identifier 522 may label, with the identifier of the certain item, one or more image to which the trained supervised ML model(s) 520 are applied (step 404) to identify the certain item. The items identifier 522 may add the newly labeled image(s) to the labeled dataset which may be used to further train the trained supervised ML model(s) 520.

The items identifier 522 may further analyze statistics of one or more of the KPIs calculated for a plurality of shopping lists created for a plurality of tracked customers 204 to identify one or more erroneous estimation patterns of the identifier of one or more erroneously estimated items. Based on the statistics analysis, the items identifier 522 may instruct and/or conduct stratified sampling to obtain additional images (samples) depicting one or more of the erroneously estimated items and labeled with the respective identifiers of the erroneously estimated item(s). The additional images may be added to the labeled dataset thus enhancing it for the erroneously estimated items. The enhance labeled dataset may be used to conduct additional training sessions to further train the trained supervised ML model(s) 520 in order to improve their estimation performance and/or accuracy. For example, assuming the items identifier 522 determines that the trained supervised ML model(s) 520 fail to accurately and/or consistently estimate the identifier of a certain item. In such case the items identifier 522 may instruct further (stratified) sampling of the certain item, i.e. capturing additional images depicting the certain item. The additional images may be labeled accordingly and added to the labeled dataset which may be used to further train the trained supervised ML model(s) 520 in order to improve their estimation performance and/or accuracy for the certain item. The items identifier 522 may further instruct capturing the additional images under one or more environmental parameters, for example, a time of day, occupancy (number of customers 204) in the store 200 and/or the like.

Optionally, based on one or more of the calculated KPIs and/or based on the statistics analysis, the items identifier 522 generates automatically one or more recommendations for improving estimation performance of the trained supervised ML model(s) 520 to identify one or more of the items offered for sale in the store 200. In particular, the items identifier 522 may generate the recommendation(s) in case the trained supervised ML model(s) 520 fail to accurately estimate the identity of the item(s) after exhausting the possibilities for the stratified sampling of this item(s). The recommendations may relate to one or more aspects of the items and/or of the images captured to depict the items, for example, presentation of the items in the store 200, deployment of the imaging sensor(s) 230, one or more operational parameters of the imaging sensor(s) 230 and/or the like.

For example, the items identifier 522 may generate a recommendation for relocating in a different presentation area (e.g. one or more shelves) a certain item which the trained supervised ML model(s) 520 fails to accurately identify. In another example, the items identifier 522 may generate a recommendation for changing (e.g. increasing) light level in a presentation area of a certain item which the trained supervised ML model(s) 520 fails to accurately identify. In another example, the items identifier 522 may generate a recommendation for changing a (deployment) location of one or more of the imaging sensor(s) 230 deployed in the store 200 to improve to improve coverage of the store 200, in particular a presentation area of a certain item which the trained supervised ML model(s) 520 fails to accurately identify. In another example, the items identifier 522 may generate a recommendation for adding and/or replacing one or more of the imaging sensor(s) 230 deployed in the store 200 with to improve coverage of the store 200, in particular a presentation area of a certain item which the trained supervised ML model(s) 520 fails to accurately identify. In another example, the items identifier 522 may generate a recommendation for adjusting one or more operational parameters of one or more of the imaging sensor(s) 230 deployed in the store 200 to improve their capturing capabilities of a certain item which the trained supervised ML model(s) 520 fails to accurately identify. The operational parameters may include for example, a field of view, a depth, a focal point, an exposure level and/or the like.

Optionally, additional images may be captured labeled and added to enhance the labeled dataset after one or more of the recommendations is applied.

Using one or more of the calculated KPIs, the items identifier 522 may constantly, periodically and/or on demand evaluate the performance, accuracy and/or quality of the trained supervised ML model(s) 520 to estimate the identifier of one or more of the items. The items identifier 522 may further evaluate improvement of the trained supervised ML model(s) 520 over time following the additional training using the enhanced labeled dataset and/or after applying one or more of the recommendations. For example, the items identifier 522 may evaluate the performance of the trained supervised ML model(s) 520 after applying stratified sampling for one or more of the items. In another example, the items identifier 522 may evaluate the performance of the trained supervised ML model(s) 520 after one or more of the imaging sensors 230 are relocated in the store 200. In another example, the items identifier 522 may evaluate the performance of the trained supervised ML model(s) 520 after applying one or more changes in the functional implementation of the trained supervised ML model(s) 520.

It is expected that during the life of a patent maturing from this application many relevant systems, methods and computer programs will be developed and the scope of the terms machine learning models, neural networks and detection algorithms are intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer implemented method of automatically producing a labeled dataset for training a supervised Machine Learning (ML) model to identify items purchased in a store, comprising:

using at least one processor for:

receiving a plurality of images captured by at least one imaging sensor deployed to monitor an interior space of a store in which a plurality of items are offered for sale;

detecting, in at least one of the plurality of images, at least one of the plurality of items picked up by at least one customer tracked while travelling in the store based on analysis of the plurality of images;

identifying the at least one tracked customer at a point of sale (POS) by analyzing at least one image depicting the POS;

detecting the at least one item while checked out at the POS based on correlation with the at least one tracked customer identified at the POS, the POS comprising a POS reader configured to read an identifier of each checked out item;

correlating between the at least one detected item and a respective identifier received from the POS reader according to a match between a timestamp of at least one image depicting the at least one tracked customer and a timestamp of the respective identifier read event received from the POS reader;

labeling automatically each of the plurality of images of the interior space which further depicts the at least one detected item with the respective identifier; and outputting a labeled dataset comprising a plurality of labeled images, the labeled dataset is used to train at least one supervised ML model to estimate the identifier of the at least one item identified in at least one new image of the interior space.

2. The computer implemented method of claim 1, wherein the at least one supervised ML model comprises a neural network.

3. The computer implemented method of claim 1, wherein the POS reader reads the identifier of each checked out item using at least one member of a group consisting of: a barcode scanner, a QR code scanner, a Radio Frequency ID (RFID) reader and a manual typing device.

4. The computer implemented method of claim 1, wherein each of the plurality of images is determined to depict at least partially the at least one item based on image analysis of the respective image.

5. The computer implemented method of claim 1, wherein the at least one item picked up by the at least one tracked customer is identified in the store using at least one detection algorithm applied to at least some of the plurality of images to identify the at least one tracked customer and at least one interaction of the at least one tracked customer with the at least one item, the at least one interaction is a member of a group consisting of: picking up the at least one item, discarding the at least one item, placing the at least one item in a shopping cart, removing the at least one item from the shopping cart, placing the at least one item in a shopping bag, removing the at least one item from the shopping bag, carrying the at least one item and transferring the at least one item to another person.

6. The computer implemented method of claim 1, wherein a performance of the at least one supervised ML model trained to identify the at least one item with a first subset of labeled images of the labeled dataset is validated using a second subset of labeled images of the labeled dataset and tested using a third subset of labeled images of the labeled dataset, the first subset, the second subset and the third subset each comprise different labeled images of the labeled dataset.

7. A system for automatically producing a labeled dataset for training a supervised Machine Learning (ML) model to identify items purchased in a store, comprising:

at least one processor executing a code, the code comprising:

code instructions to receive a plurality of images captured by at least one imaging sensor deployed to monitor an interior space of a store in which a plurality of items are offered for sale;

code instructions to detect, in at least one of the plurality of images, at least one of the plurality of items picked up by at least one customer tracked while travelling in the store based on analysis of the plurality of images;

code instructions to identify the at least one item while checked out for the at least one tracked customer at a point of sale (POS) by analyzing at least one image depicting the POS;

code instructions to detect the at least one item while checked out at the POS based on correlation with the at least one tracked customer identified at the POS, the POS comprising a POS reader configured to read an identifier of each item of the plurality of items checked out at the POS;

code instructions to correlate between the at least one detected item and a respective identifier received from the POS reader according to a match between a timestamp of the at least one image depicting the at least one tracked customer and a timestamp of the respective identifier read event received from the POS reader;

code instructions to label automatically each of the plurality of images of the interior space which further depicts the at least one detected item with the respective identifier; and code instructions to output a labeled dataset comprising a plurality of labeled images, the labeled dataset is used to train at least one supervised ML model to estimate the identifier of the at least one item identified in at least one new image of the interior space.

8. A computer implemented method of automatically producing a labeled dataset for training a supervised Machine Learning (ML) model to identify items purchased in a store, comprising:

using at least one processor for:

receiving a plurality of images captured by at least one imaging sensor deployed to monitor a point of sale (POS) in a store in which a plurality of items are offered for sale, the POS comprising a POS reader configured to read an identifier of each of the plurality of items checked out at the POS;

detecting at least one of the plurality items while checked out at the POS by analyzing at least one of the plurality of images;

correlating between the at least one detected item and a respective identifier received from the POS reader according to a match between a timestamp of the at least one image and a timestamp of the identifier read event received from the POS reader;

labeling automatically the at least one image depicting the at least one detected item with the respective identifier; and outputting a labeled dataset comprising a plurality of labeled images, the labeled dataset is used to train at least one supervised ML model to estimate the identifier of the at least one item identified in at least one new image.

\* \* \* \* \*